United States Patent [19]

Lamers

[11] Patent Number: 5,527,226
[45] Date of Patent: Jun. 18, 1996

[54] PULLEY

[75] Inventor: Hendrikus F. Lamers, Goirle, Netherlands

[73] Assignee: Van Doorne's Transmissie B.V., Tilburg, Netherlands

[21] Appl. No.: 354,895

[22] Filed: Dec. 9, 1994

[30] Foreign Application Priority Data

Dec. 15, 1993 [NL] Netherlands ............... 9302183

[51] Int. Cl.⁶ ................................. F16H 55/56
[52] U.S. Cl. ................................... 474/43
[58] Field of Search ............... 474/43–45, 18, 474/28

[56] References Cited

U.S. PATENT DOCUMENTS

| | | | |
|---|---|---|---|
| 2,722,131 | 11/1955 | Chankalian et al. | 474/43 X |
| 3,085,446 | 4/1963 | Erickson | 474/43 X |
| 3,478,610 | 11/1969 | Sakai | 474/43 |
| 3,636,785 | 1/1972 | Weindler et al. | 474/43 |
| 4,568,315 | 2/1986 | Tomiyori et al. | 474/43 X |
| 4,578,049 | 3/1986 | Sakai | 474/43 X |
| 4,588,389 | 5/1986 | Sakai | 474/43 |

FOREIGN PATENT DOCUMENTS

| | | |
|---|---|---|
| 0389030 | 9/1990 | European Pat. Off. . |
| 0520611 | 12/1992 | European Pat. Off. . |
| 0560427 | 9/1993 | European Pat. Off. . |
| 3168452 | 7/1991 | Japan . |

Primary Examiner—Roger J. Schoeppel
Attorney, Agent, or Firm—Young & Thompson

[57] ABSTRACT

Pulley for a continuously variable transmission provided with a set of discs on a pulley shaft. At least one of the set of discs is axially movable, and at least one axially fixed bearing is interposed between the pulley and a transmission housing. One or more of the bearings are mounted on a disc of the pulley.

9 Claims, 2 Drawing Sheets

PULLEY

FIELD OF THE INVENTION

The invention relates to a pulley, in particular for a continuously variable transmission, provided with a set of discs on a pulley shaft, at least one disc being axially movable by means of displacement means, as well as one or more bearings for accommodating the pulley with respect to a supporting element, in particular a transmission housing.

BACKGROUND OF THE INVENTION

A pulley of this type is disclosed in JP-A 3 168 452 and is widely used in continuously variable transmissions. Transmissions of this type are used, inter alia, in motor vehicles. In the case of this known pulley, the pulley shaft extends axially beyond the discs, so that mountings for one or both bearings can be mounted at this location to accommodate the pulley with respect to a supporting element, for example a transmission housing. For one or both bearings, a disc can also be provided with an axial protrusion which provides a mounting for said bearing. Both the protruding pulley shaft and the axial protrusion on the pulley shaft demand an appreciable installation space, especially in the axial direction. For many applications, such as, for example, for motor vehicles, such an installation space is not available, or the installation space is preferably kept as restricted as possible.

SUMMARY OF THE INVENTION

The aim of the invention is to provide a compact pulley requiring a limited axial installation space. To this end, the pulley according to the invention is characterised in that at least one bearing is mounted on a disc, or the displacement means for the disc, in such a way that the bearing mounted on the disc or the displacement means for the disc is at least partially enclosed in the axial direction by the disc or the displacement means for the disc, or at least partially encloses said disc or said displacement means for the disc in the axial direction.

According to a further development of the invention, the disc is connected to one end of the pulley shaft and the bearing is mounted axially on the disc beyond the end of the pulley shaft. In this way, the bearing can be virtually completely enclosed by the disc, so that no length or only a very small length is required for installation.

The pulley shaft-disc assembly can comprise a recess for accommodating a stub axle radially inwards from the bearing, which stub axle, in turn, can be accommodated in the transmission housing. The interface between the bearing and the supporting element, in particular the transmission housing, offers a direct and internal mounting which requires a very short length for installation.

According to another embodiment of the invention, wherein the displacement means comprise a piston-cylinder assembly, the bearing is mounted in the piston or the piston-cylinder assembly, which optionally is of the multiple type in which a piston also acts as cylinder, which to this end can be provided with an axial mounting for at least partially accommodating the bearing.

BRIEF DESCRIPTION OF THE DRAWINGS

The invention, together with the further advantages thereof, will be explained in more detail with reference to a drawing. In the drawing.

DETAILED DESCRIPTION OF THE INVENTION

Figure 1:
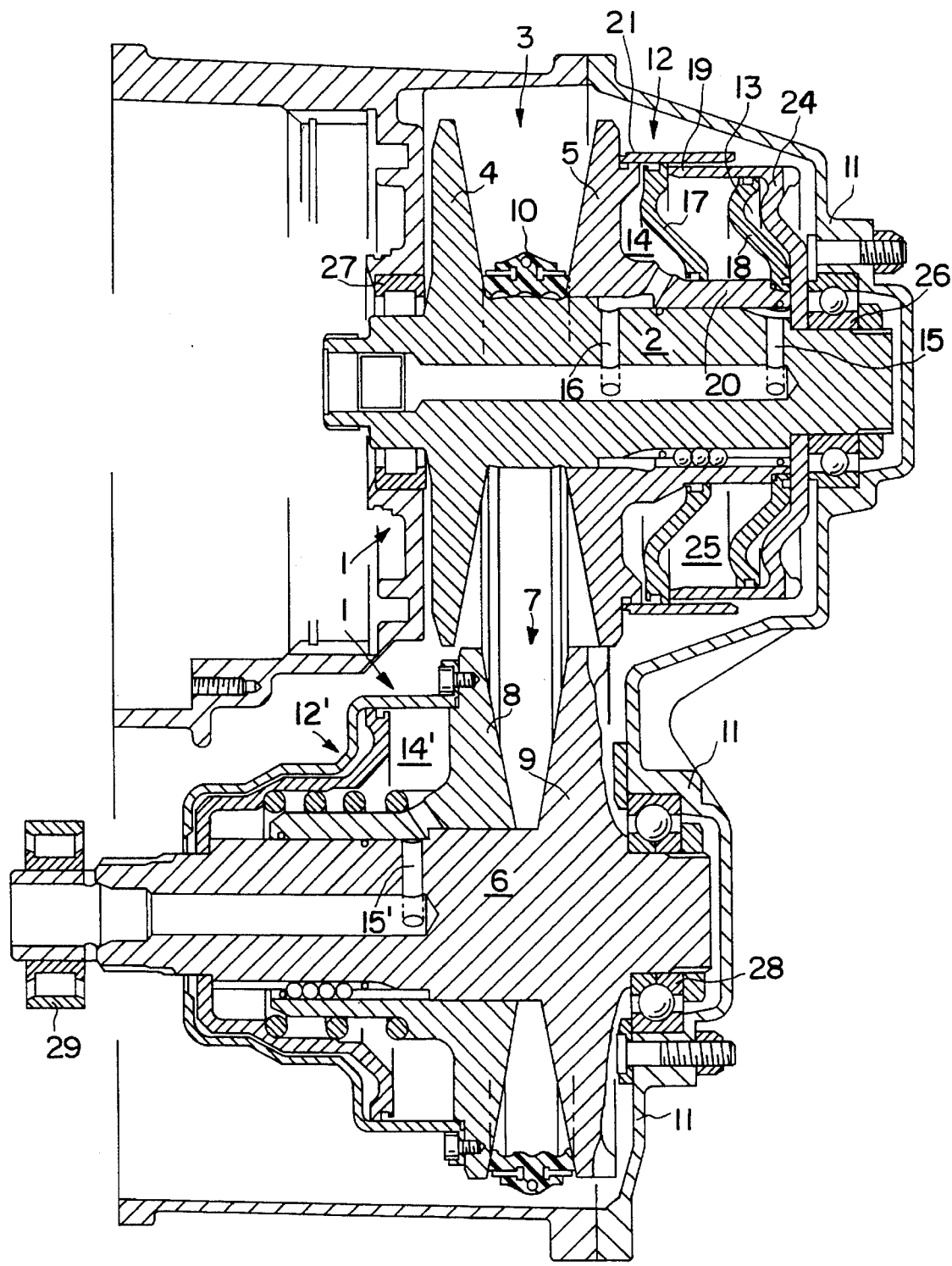
FIG. 1 shows a continuously variable transmission provided with a pulley according to the prior art.

FIG. 1 shows, diagrammatically, part of a continuously variable transmission 1 according to the prior art. The transmission 1 has a primary pulley 3 which has a primary shaft 2 and discs 4 and 5, of which disc 5 is axially movable over the shaft 2 in a manner which will be explained below. The transmission 1 also comprises a secondary pulley 7 which has a secondary shaft 6 and discs 8 and 9, of which disc 8 is slidable over the shaft 6. An endless drive belt, chain or strap 10 is placed around the pulleys 3 and 7, the radii of movement of the strap 10 between the sets of discs 4, 5; 8, 9 being variable and dependent on the axial position of the slidable discs 5 and 8.

In a manner known per se, the primary shaft 2 is coupled to an engine, which is not shown, and the secondary shaft 6 is coupled to wheels of a vehicle, which is not shown.

The pulleys 3 and 7 are located inside the transmission housing 11, part of which is shown. The axially movable disc 8 of pulley 7 has cylinder-piston means 12', which enclose one pressure chamber 14', which is fed through passage 15'.

The axially movable disc 5 has cylinder-piston means 12 having a pressure chamber 14 and a second pressure chamber 13. Chamber 25 is at atmospheric pressure. Via appropriate passages 15 and 16, medium under pressure is supplied to and removed from, in this case, the two chambers 13 and 14, in order by this means to influence the axial position of disc 5. The pressure chamber 13 has walls 18 and 24, which are directed essentially radially, as well as wall 19 and shaft 2. Wall 17 is slidable between wall 20 and cylinder wall 21 of the disc 5. Furthermore, wall 17 bears against the wall 19, so that the assembly 17, 19, 24 acts both as piston (17) and as cylinder (19, 24). Wall 18 is at its outer perhpery is in slidable contact with wall 19 and at its inner circled end is firmly fixed to, in this embodiment, wall 20 of the disc 5.

In the continuously variable transmission in FIG. 1 according to the prior art, both the primary pulley shaft 2 and the secondary pulley shaft 6 extend axially on either side to allow mounting of the bearings 26, 27 and 28, 29, respectively. Said bearings effect accommodation of the pulleys 3, 7 with respect to a supporting element, in this case the transmission housing 11. The longer shafts 2, 6 demand an appreciable space for installation. For many applications, especially in motor vehicles, this installation space is not available, or the installation space is kept as restricted as possible.

Figure 2A:
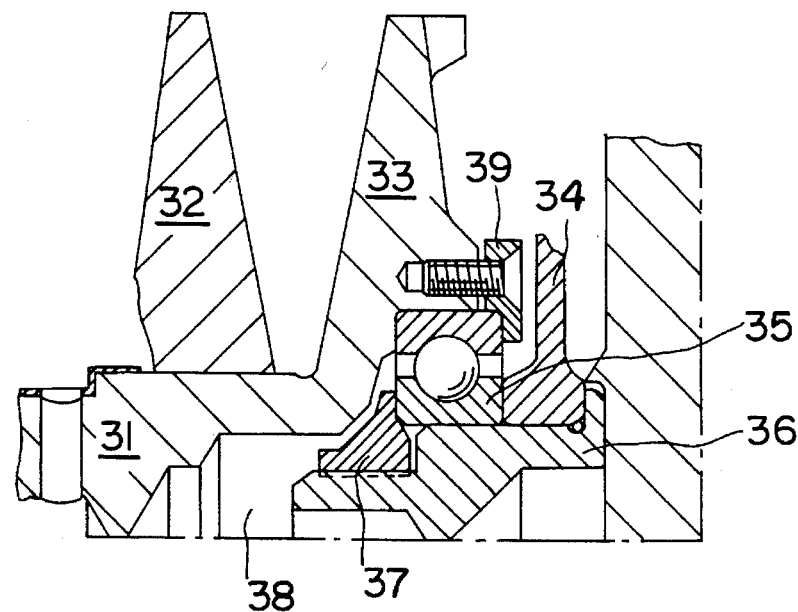
FIG. 2a shows a diagrammatic first embodiment of the pulley according to the invention.

In the first embodiment of the invention according to FIG. 2a, a fixed disc 33 is attached to the end of shaft 31. In addition, a disc 32 is mounted so as to be axially movable on shaft 31. The shaft 31/disc 33 assembly comprises a recess 38. A bearing 35 is mounted on the disc 33 axially beyond the end of the shaft 31. With this arrangement, the bearing 35 is mounted radially outwards in the disc and mounted radially inwards on a stub axle 36. Said stub axle 36 is, on one side, fixed in the transmission housing 34 and, on the other side, extends into the recess 38. The bearing 35 is fixed on the stub axle 36 by means of a retaining ring 37 and on the disc 33 by means of a retaining ring 39. It will be clear that in this way a very restricted space is needed for installation and a compact pulley and transmission are obtained. The pulley is very close to the transmission housing. This embodiment is, in particular suitable for application at the location of a fixed disc.

Figure 2B:
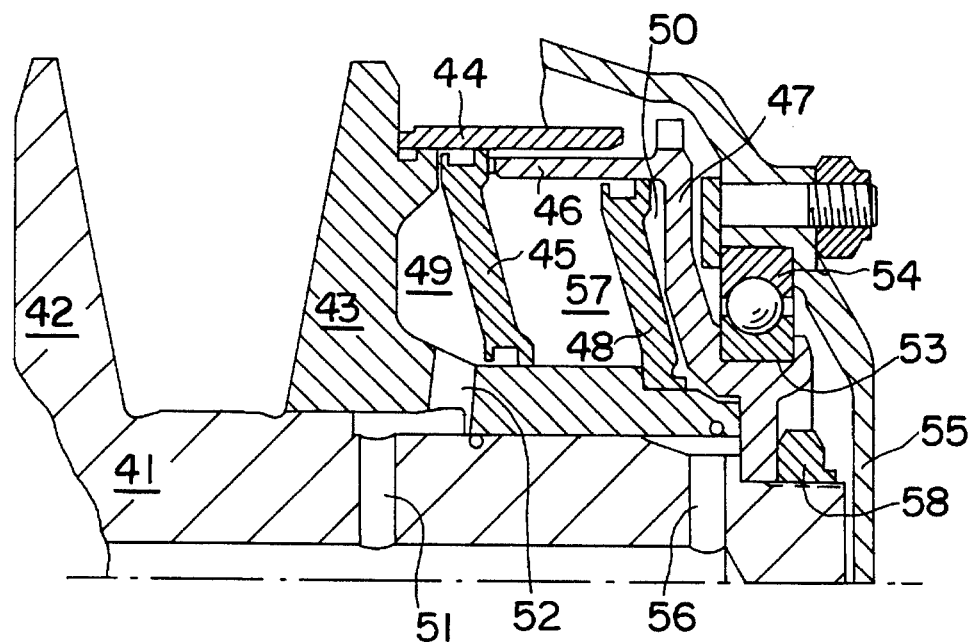
FIG. 2b shows a diagrammatic second embodiment of the pulley according to the invention.

FIG. 2b shows a second embodiment of the invention which, in particular, is suitable for application with a movable disc. A fixed disc 42 and a movable disc 43 are mounted on shaft 41. The movable disc 43 is provided with displacement means (44 to 52), which in this case are of the multiple piston-cylinder type. A first pressure chamber 49 is enclosed by cylinder wall 44 with piston 45 and is fed though passages 51, 52. A second pressure chamber 50 is enclosed by cylinder walls 46, 47 and piston 48. Chamber 50 is fed through bore 56. Chamber 57, which is located between the two pressure chambers 49 and 50, is at atmospheric pressure. With this arrangement the piston-cylinder assembly 45, 46, 47 therefore acts both as piston 45 and as cylinder 46, 47. With this arrangement, the cylinder wall 47 is fixed to shaft 41 by means of a retaining ring 58. Furthermore, the cylinder wall 47 is provided with a bearing ring 53 which extends axially for a bearing 54. The bearing 54 is fixed radially outwards in the transmission housing 55. This embodiment of the invention also demands only a limited space for installation and the compact pulley is very close to the transmission housing.

With both embodiments shown, a shorter axial installation length is achieved, without this resulting in a greater installation length in other directions, for example radially.

Finally, it will be clear that a large number of further embodiments are conceivable within the inventive concept.

I claim:

1. Pulley for a continuously variable transmission, the pulley having a set of discs on a pulley shaft, a displacement mechanism for axially moving at least one said disc, and at least one axially fixed bearing interposed between the pulley and a transmission housing; wherein said bearing is directly mounted on and axially overlaps one of said disc and displacement mechanism.

2. Pulley according to claim 1, wherein one disc is connected to one end of the pulley shaft and the bearing on said disc is mounted axially beyond the end of the pulley shaft.

3. Pulley according to claim 2, wherein the pulley shaft-disc assembly comprises a recess for accommodating a stub axle radially inwards from the bearing.

4. Pulley according to claim 3, wherein the stub axle can be accommodated in a transmission housing.

5. Pulley according to claim 1, wherein the displacement mechanism is of the multiple piston-cylinder type and the bearing is mounted on said piston-cylinder assembly.

6. Pulley according to claim 5, wherein the piston or the piston-cylinder assembly is provided with an axial bearing ring for at least partially accommodating the bearing.

7. Pulley according to claim 1, wherein the bearing is a radial bearing.

8. Pulley according to claim 1, in which the bearing is mounted on and is surrounded by an-axially fixed said disc.

9. Pulley according to claim 1, wherein said bearing is fixed on and surrounds said displacement means.

* * * * *